3,242,213
DIAMIDES
Jack Preston, Raleigh, and Frank Dobinson, Chapel Hill, N.C., assignors to Monsanto Company, a corporation of Delaware
No Drawing. Filed Sept. 11, 1962, Ser. No. 222,933
4 Claims. (Cl. 260—558)

This invention relates to new aromatic diamines. More particularly, the invention relates to new wholly aromatic diamines composed of two amino-aryls linked by carbonamide groups to a third and central aromatic ring and to a method for their preparation.

There are several well-known methods for the preparation of aromatic diamines useful in the production of polyamides. According to the prior art, the diamines which are useful in the preparation of aromatic polyamides are diamines which have aminoaryl groups linked directly together as in benzidine or linked by oxygen, sulfur, $SO_2$, a lower alkylene, a lower alkylene dioxy, or similar groups which are non-reactive in the polymerization reaction. By far the most practical diamine and the only one employed extensively commercially for the preparation of polymers is m-phenylene diamine which has both amino groups on the same aromatic nucleus. It can readily be seen that putting the amino groups in different aromatic rings adds to the overall weight of the repeating unit which is from amide group to amide group in the polymer. Consequently, the number of hydrogen bonds available per repeating unit falls off as the weight of the diamine increases and the physical properties of the polymer such as tenacity would likewise diminish. Furthermore, since the amide groups of the polymer are the most likely sites where solvents are attached to dissolve the polymer, a decrease in the relative number of amide groups would render the polymer less soluble. The percent nitrogen contained in amide polymer links may be taken as the measure of the relative concentration of hydrogen bonds in the repeating units of the polymer. Thus, for poly-m-phenylene isophthalamide the percent amide nitrogen is 11.76 percent, but for polyisophthalamides from the diamines such as benzidine and bis-(p-aminophenyl) methane the percent amide nitrogen drops to 8.91 percent and 7.86 percent respectively, and the solubility of the polyamides likewise decreases. A way of overcoming the problem of decreasing amide links would be to provide new diamines having amide links between amino and aryl groups.

Accordingly, it is an object of the invention to prepare new diamines for the production of thermally resistant polyamides. It is another object of the invention to provide new wholly aromatic diamines wherein the aminoaryl groups are linked together by (N,N'-arylenebisamide) links. An additional object of the invention is to provide new diamines that are more stable to air oxidation and discoloration than aromatic diamines known in the prior art. Still another object of the invention is to prepare new diamines that will require the use of less diacid halide for a given weight of polymer and be easier to polymerize with diacid halides than the diamines currently claimed in the prior art. Other objects and advantages will become apparent from the description which follows hereafter.

The diamines of this invention consist of two aminoaryl units joined by carbonamide linkages to a third and central aromatic ring. The three aromatic rings of these diamines may be single, multiple or fused rings. The diamines are produced by the condensation of a nitroaromatic acid with an aromatic diamine, preferably wherein both amino groups are on the same aromatic nucleus. The reaction may be represented as follows:

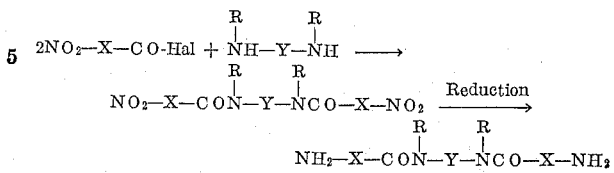

wherein X and Y represent aromatic radicals which may have a single, multiple or fused ring structure such as phenylene, biphenylene or naphthylene, wherein R is selected from hydrogen, lower alkyl of up to 3 carbon atoms and phenyl and Hal may be any suitable halo such as chloro-, bromo-, or iodo-.

The reaction typically involves preparing a solution of a nitro benzoyl halide, preferably nitro benzoyl chloride in a solvent which is then mixed with a solution or dispersion of m-phenylene diamine in the presence of a proton acceptor in a ratio of 2 moles of nitro benzoyl halide per mole of m-phenylene diamine and agitated to produce the dinitro intermediate. The dinitro compound is then reduced to the diamine using any suitable reducing agent available in the prior art. An alternate route for the preparation of the dinitro intermediates involving the condensation of the nitroaromatic acid or ester rather than the acid chloride is possible but not preferable.

The preparation of the dinitro intermediates may be accomplished by using a Schotten-Baumann or a solution reaction. The Schottten-Baumann or interfacial type reaction involves the use of the nitroaromatic acid chloride in a suitable solvent which will dissolve the acid chloride and which will at the same time not adversely affect the arylene diamine which is to be added. Suitable solvents include chloroform, tetrahydrofuran, benzene, benzonitrile, acetophenone, acetonitrile, and other solvents. Tetrahydrofuran is preferred. The arylene diamine portion is added to the solution of the nitroaromatic acid chloride with a small amount of an acid acceptor. Suitable acid acceptors include tertiary amines, e.g., pyridine, triethyl amine, trimethyl amine, tripropyl amine; hydroxides such as sodium hydroxide, lithium hydroxide, calcium hydroxide or potassium hydroxide. The arylenediamine is dispersed in water, at least 100 ml. of water per 10 gms. of diamine, which aids in neutralizing the hydrochloric acid formed during the reaction. The reaction mixture is then stirred rapidly until the reaction is completed and the dinitro compound is filtered from the reaction mixture. For best results, the dinitro intermediate should be purified by recrystallization before reduction.

The solution method differs from the Schotten-Baumann in that the arylenediamine is dissolved in an organic solvent such as dimethylacetamide, ethylene glycol dimethyl ether or pyridine, rather than merely dispersed or dissolved in water. In the solution method a common solvent may be used for both the nitroaromatic acid chloride and the arylenediamine.

Reduction of the dinitro intermediate to the diamine may take place by any of several well-known reduction processes. The dinitro intermediates may be reduced both catalytically and chemically. Catalytic reduction may be effected in an alcohol, or in solution in dimethylformamide or similar compounds, utilizing a typical Parr hydrogenation unit or ether unit, and a catalyst such as 5 percent palladium on charcoal, Raney nickel, cobalt, and other similar heavy metal catalysts for reduction. Reductions may also be effected using chemical methods such as stannous chloride and hydrochloric acid, iron and sulfuric acid, polysulfide solutions, etc. The chemical reduction with stannous chloride and hydrochloric acid works quite satisfactorily to yield the dihydrochloride of the diamine. The free diamine may be obtained by dissolving the dihydrochloride in hot water, filtering the resulting solution, neutralizing the hydrochloric acid with base, and finally collecting and drying the precipitate.

The diamines produced according to the process of this invention have the following general formula:

$$R-N(H)-X-C(=O)-N(R)-Y-N(R)-C(=O)-X-N(H)-R$$

wherein R is hydrogen, lower alkyl or phenyl groups, and wherein X and Y represent aromatic radicals. These aromatic radicals may have a single, multiple or fused ring structure and may have one or more of the hydrogens in each ring replaced by non-polyamide forming substituents such as alkyl, nitro, alkoxy and the like. Suitable aromatic radicals for Y may have the following structural formulas:

[structural formulas of aromatic radicals with $A_n$ substituents]

wherein Q may be $$-S(=O)_2-,\ -C(R')(R')-,\ -S-,\ \text{and}\ -O-$$

in which R' is hydrogen or a lower alkyl group of up to 3 carbon atoms, A may be a lower alkyl, lower alkoxy, halo, nitro and $n$ is a number from 0–4 inclusive. Suitable aromatic radicals which may be represented by X include any of the above radicals given for Y and additional radicals which have structural formulas such as

[structural formulas]

wherein A, $n$ and Q have the same significance as described for Y. The use of additional radicals, such as those shown, for X is possible because of the use of two X radicals in the diamine and only one Y. Generally, the position of the bonds X and Y is not critical such as when coatings on films are desired. However, for purposes of forming fibers and filaments, since only one Y is present, all Y aromatic radicals must be symmetrical, that is, they must have at least one plane of symmetry. This symmetrical configuration is necessary in order for the diamine to be useful in the preparation of high molecular weight, crystalline, fiber forming polymers. Since there are two X radicals present, they will balance each other and necessarily preserve the overall symmetry of the diamine. For example, Y cannot be 1,7-naphthalene when a fiber forming composition is desired because it is not a symmetrical radical whereas X may be 1,7-naphthalene or other unsymmetrical radicals. Thus, it may be seen that the diamines of this invention may have all phenylene rings or may have a combination of phenylene, naphthalene and biphenylene rings or other multiple and fused ring structures so long as the overall symmetry of the end product is maintained.

As typical examples of diamines suitable for the preparation of fibers and filaments coming within the scope of the above general formula there may be mentioned N,N'-m-phenylenebis(m-aminobenzamide),
N,N'-m-phenylenebis(p-aminobenzamide),
N,N'-p-phenylenebis(m-aminobenzamide),
N,N'-p-phenylenebis(p-aminobenzamide),
N,N'-(2,7-naphthalene)bis(p-aminobenzamide),
N,N'-(1,5-naphthalene)bis(m-aminobenzamide),
N,N'-(1,5-naphthalene)bis(p-aminobenzamide),
N,N'-(2,7-naphthalene)bis(m-aminobenzamide),
N,N'-m-phenylenebis(7-amino-2-naphthamide),
N,N'-p-phenylenebis(7-amino-2-naphthamide),
N,N'-m-phenylenebis(7-amino-1-naphthamide),
N,N'-m-phenylenebis(3'-aminobiphenyl-3-carbonamide),
N,N'-p-phenylenebis(3'-aminobiphenyl-3-carbonamide),
N,N'-(2,7-naphthalene)bis(3'-aminobiphenyl-3-carbonamide),
N,N'-(2,7-naphthalene)bis(7-amino-2-naphthamide),
N,N'-tetramethyl-p-phenylenebis(4'-aminobiphenyl-4-carbonamide) and the like.

Unsymmetrical diamines of the general formula useful for films and coatings include N,N'-(1,7-naphthalene)bis(m-aminobenzamide),
N,N'-(1,7-naphthalene)bis(3'-aminobiphenyl-3-carbonamide),
N,N'-(1,7-naphthalene)bis(1-amino-2-naphthamide)
and the like.

The diamines of this invention are obtained in good yield and high purity and have high melting points. They are substantially more stable toward the effects of air, light, moisture and common organic solvents than other aromatic diamines. Useful filament, film and fiber forming polymers may be prepared in a wide range of compositions using the diamines of this invention.

In order to further illustrate the present invention and the advantages thereof, the following specific examples are given, it being understood that these are merely intended to be illustrative. In the examples all parts and percents are by weight unless otherwise indicated.

*Example I*

A solution of 38 gms. of m-nitrobenzoyl chloride in 40 ml. of dry chloroform was prepared and poured all at once into a Blendor jar containing 10.8 gms. of m-phenylenediamine, 0.1 gm. of sodium n-lauryl sulfonate as an emulsifier and 13 gms. of potassium hydroxide dissolved in 200 ml. of water. The reaction mixture was agitated rapidly, filtered and re-washed with warm water and filtererd again. The resulting dried product, the intermediate in the preparation of the diamine, which may be called N,N'-m-phenylenebis(m-nitrobenzamide) was obtained in 85 percent yield and had a melting point of approximately 270° C. A 5 gm. portion of this intermediate was placed in a 250 ml. flask and refluxed with 50 ml. of absolute ethanol. The mixture was then cooled and a solution, prepared by dissolving 25 gms. of stannous chloride hydrate in 30 ml. of concentrated hydrochloric acid with 50 ml. of absolute ethanol, was added. A clear solution was obtained upon refluxing about 30 minutes. When the solution cooled, the diamine hydrochloride crystallized and was filtered, washed with ethanol and filtered again. The diamine was isolated by contacting the hydrochloride with sodium carbonate solution.

The product, N,N'-m-phenylenebis(m-aminobenzamide) was obtained in approximately 70 percent yield and had a melting point of 212° C.

*Example II*

A solution of 38 gms. of p-nitrobenzoyl chloride in 40 ml. of chloroform was mixed in a Blendor jar with 10.8 gms. of m-phenylenediamine and 13 gms. of potassium hydroxide in 200 ml. of water. The mixture was agitated rapidly for five minutes, filtered and the product recovered to give a 96 percent yield of N,N'-m-phenylenebis(p-nitrobenzamide). A 5 gm. portion of this dinitro compound was then reduced to the diamine by stirring it in 50 ml. of ethanol in a 250 ml. flask with a solution of 25 gms. of stannous chloride dihydrate and 30 ml. of concentrated hydrochloric acid and 50 ml. of ethanol. The mixture was refluxed for one hour, cooled and filtered. The residue was then slurried in ethanol and filtered and the product filtered and decolorized with charcoal. The filtrate was made basic and the diamine then precipitated. The diamine, N,N'-m-phenyenebis-(p-aminobenzamide), thus obtained had a melting point of 217–220° C. and was stable to 300° C. or better.

*Example III*

In this example a 4.06 gm. sample of N,N'-m-phenylenebis(m-nitrobenzamide) was catalytically reduced in alcohol using a palladium charcoal catalyst system. The 4.06 gm. sample was placed in 100 ml. of methanol in a Parr hydrogenation unit with 0.1 gm. of 5 percent palladium on charcoal as catalyst. The system was pressurized to 48 p.s.i. with hydrogen in the system, shaken and heated at 50° C. for three hours. After the methanol was evaporated the product was heated with dilute hydrochloric acid and filtered. The filtrate was made basic and a yield of 3 gms. (87 percent of theory) of N,N'-m-phenylenebis(m-aminobenzamide) was obtained. A polarographic analysis indicated that the sample contained only 300 parts per million of nitro groups.

A similar procedure to that above was followed except that dimethyl formamide was used as a solvent and the product isolated as above.

*Example IV*

This example shows the preparation of a dinitro intermediate using a solution reaction instead of a typical Schotten-Baumann. Into a conical flask fitted with a Teflon stirrer blade turned on end was charged 1.08 gm. (0.01 mole) of m-phenylenediamine and 15 ml. of dry dimethylacetamide. After solution was effected, 3.75 gm. (0.02 mole) of m-nitrobenzoyl chloride was added all at once. A clear solution was obtained, but after 15 minutes a solid was noted to be crystallizing from the solution. At the end of a 20 minute period the contents of the flask were poured into 150 ml. of water in a Blendor jar. The product, N,N'-m-phenylenebis(m-nitrobenzamide), was collected on a filter, washed and dried. The yield was 3.5 gm. (86 percent of theory) and the melting point was 262–265° C.

The above experiment was repeated using pyridine as dual solvent and acid acceptor. The yield was 3.1 gm. (76 percent of theory) and the melting point was 263–266° C.

Another experiment was performed in a similar manner using ethylene glycol dimethyl ether as reaction medium. Approximately 2 gm. triethyl amine was added to the reaction to serve as acid acceptor, although the reaction appeared to have gone satisfactorily without it. The expected product was isolated as before in good yield (84 percent of theory).

*Example V*

A solution of 38 gms. of m-nitrobenzoyl chloride in 40 ml. of tetrahydrofuran was added to a Blendor jar containing 10.8 gms. of p-phenylenediamine, 200 ml. of water and 14 gms. of sodium hydroxide. The reaction mixture was stirred rapidly for ten minutes and then filtered. The product, N,N'-p-phenylenebis(m-nitrobenzamide), was washed in hot water and dried and was obtained in approximately 95 percent yield with a melting point of 340° C. Reduction was accomplished by placing 38 gms. of the N,N'-p-phenylenebis(m-nitrobenzamide) and 250 ml. of absolute ethanol in a 1-liter flask. A solution of 125 gms. of stannous chloride in 150 ml. concentrated hydrochloric acid and 250 ml. of absolute ethanol was added to the flask and the mixture refluxed for one hour. The reaction solids were slurried in ethanol, filtered then placed in boiling water. The product obtained by making the filtrate basic, N,N'-p-phenylenebis(m-aminobenzamide), had a melting point of 289–291° C.

*Example VI*

A 15.8 gm. portion of naphthalene-2,7-diamine was blended with 200 ml. of ice water containing 9 gms. sodium hydroxide. A solution of 38 gms. of m-nitrobenzoyl chloride in 40 ml. of tetrahydrofuran was added and the mixture blended for 5 minutes. The resulting N,N'-(2,7-naphthalene)bis(m-nitrobenzamide) was filtered hot in hydrochloric acid, sodium hydroxide and water. While still moist this nitro intermediate was reduced to the diamine by adding it to 250 ml. of ethanol, 150 ml. of concentrated hydrochloric acid and 125 gms. of stannous chloride and refluxing the mixture for one hour. Recovery of the diamine, N,N'-(2,7-naphthalene)bis(m-aminobenzamide), was effected by hot filtration and making the filtrate basic. The melting point of this diamine was 227–230° C.

*Example VII*

In this example N,N'-(1,5-naphthalene)bis(m-aminobenzamide) was prepared following the procedure of Example VI using the exact same portions of reactants.

*Example VIII*

A 51.4 gm. portion of benzidine dihydrochloride was suspended in a chilled solution of 32 gms. sodium hydroxide in 2,000 ml. of water in a Waring blender. 76 gms. of meta-nitrobenzoyl chloride dissolved in 120 ml. of tetrahydrofuran was added all at once to the blending suspension. After 10 minutes the stirring was stopped and the product removed by filtration, diluted and filtered. The resulting dinitro intermediate in a 20.5 gm. portion was refluxed with 110 ml. of ethanol and 63 ml. of concentrated hydrochloric acid containing 57 gms. of stannous chloride for 90 minutes, after which time a further 110 ml. portion of ethanol was added. The pale yellow suspension of diamine dihydrochloride was cooled and removed by filtration then placed in a Waring Blendor with one liter of distilled water. To the vigorously blending suspension was added dilute base until the water gave a basic reaction. The final diamine product was removed by filtration, dried and obtained in a yield of 16.1 gm. with a melting point of 295–297° C.

*Example IX*

In this example a 41 gm. portion of durene diamine was suspended in a chilled solution of 20 gms. of sodium hydroxide in 1000 ml. of deionized water in a Waring blendor. The solution of 95 gms. of m-nitrobenzoyl chloride in 120 ml. tetrahydrofuran was added all at once to the blending suspension and blended for 10 minutes. The solid product was removed by filtration, washed in hot dilute hydrochloric acid, hot dilute sodium hydroxide solution, and finally in water. The yield was approximately 77 gms. A portion of the dinitro compound (46.2 gms.) was stirred with 135 gms. of stannous chloride, 150 ml. of concentrated hydrochloric acid and 250 ml. of ethanol. The suspension was refluxed for 90 minutes, then quickly cooled. The diamine dihydrochloride was filtered off and suspended in one liter of deionized water in a Waring blendor. Dilute base was added to the vigorously stirred reaction until the suspension gave an alkaline reaction. The diamine was then filtered off and dried. The yield was 33.2 gms. and the melting point 337° C.

As many widely different embodiments of this invention may be made without departing from the spirit and scope thereof, it is to be understood that the invention is not to be limited to any specific embodiments except as defined in the appended claims.

We claim:
1. N,N'-(2,7-naphthalene)bis(m-aminobenzamide).
2. N,N'-(1,5-naphthalene)bis(m-aminobenzamide).
3. N,N'-(2,7-naphthalene)bis(m-nitrobenzamide).
4. N,N'-m-phenylenebis (7-amino-2-naphthamide).

References Cited by the Examiner

UNITED STATES PATENTS

| | | | |
|---|---|---|---|
| 2,186,769 | 1/1940 | Schirm | 260—558 X |
| 2,448,853 | 9/1948 | Allen et al. | 260—558 X |
| 2,741,659 | 4/1956 | Schmid et al. | 260—558 |
| 2,996,543 | 8/1961 | Kinstler | 260—558 |

FOREIGN PATENTS 284,247   4/1929   Great Britain.

OTHER REFERENCES

Krasovitskii et al.: Chemical Abstracts, vol. 52, page 6273 (1958), (Abstract of Ukrain. Khim. Zhur., vol. 23, pages 496–50 (1957)).

Noller: Chemistry of Organic Compounds, 2nd ed., pages 161 and 204, Philadelphia, Saunders, 1958.

Tomohiko et al.: Chemical Abstracts, vol. 46, page 8035 (1952), (Abstract from Jour. Pharm. Soc., Japan, vol. 71, pages 1478–81) (1951).

WALTER A. MODANCE, *Primary Examiner.*

DUVAL T. McCUTCHEON, NICHOLAS S. RIZZO, ROBERT L. PRICE, NATALIE TROUSOF,
*Assistant Examiners.*